United States Patent
Koch

[11] Patent Number: 5,947,014
[45] Date of Patent: Sep. 7, 1999

[54] APPARATUS FOR PROCESSING A COCOA BUTTER-CONTAINING OR SIMILAR FAT-CONTAINING MASS, PARTICULARLY A CHOCOLATE MASS

[75] Inventor: Peter Koch, Pinneberg, Germany

[73] Assignee: Hosokawa Kreuter GmbH, Hamburg, Germany

[21] Appl. No.: 09/179,248

[22] Filed: Oct. 27, 1998

[30] Foreign Application Priority Data

Nov. 7, 1997 [DE] Germany .......................... 197 49 324

[51] Int. Cl.⁶ .............. A23G 1/00; A23G 1/10; A23G 1/18; A23G 7/02
[52] U.S. Cl. ................ 99/517; 99/348; 99/455; 99/485; 366/144; 366/149
[58] Field of Search ............. 99/348, 452–455, 99/460, 464, 466, 467, 470, 483, 485, 516, 517; 62/71, 94, 354, 374, 346, 380; 118/21, 22, 17, 30, 31; 366/144, 149, 293, 338, 325.1, 288, 299, 301, 287; 425/130, 362, 363, 367, 294; 426/231, 519, 520, 524, 572, 660

[56] References Cited

U.S. PATENT DOCUMENTS

| | | | |
|---|---|---|---|
| 3,985,607 | 10/1976 | Schmitt | 366/338 X |
| 4,059,047 | 11/1977 | Sollich | 62/354 X |
| 4,178,105 | 12/1979 | Sollich | 99/455 |
| 4,195,935 | 4/1980 | Sollich | 366/325.1 |
| 4,293,570 | 10/1981 | Vadasz | 99/517 X |
| 4,341,476 | 7/1982 | Sollich | 366/293 |
| 4,446,781 | 5/1984 | Schmitt | 425/206 |
| 4,706,558 | 11/1987 | Snyder, Jr. | 99/517 X |
| 4,892,033 | 1/1990 | Sollich | 99/517 X |
| 5,032,418 | 7/1991 | Sollich | 426/520 |
| 5,156,867 | 10/1992 | Leuthold et al. | 99/348 X |
| 5,332,588 | 7/1994 | Capodieci | 426/660 X |
| 5,351,609 | 10/1994 | Muntener | 99/485 |

FOREIGN PATENT DOCUMENTS 8817255 2/1996 Germany .

Primary Examiner—Timothy F. Simone
Attorney, Agent, or Firm—Friedrich Kueffner

[57] ABSTRACT

An apparatus for continuously processing a cocoa-butter containing or similar fat-containing mass, particularly a chocolate mass, includes an outer stationary cooling cylinder, wherein the mass to be processed is pumped through the interior of the stationary cooling cylinder from one end face thereof into the area of the other end face. The apparatus further includes a driven agitating element in the interior of the cooling cylinder. A driven inner cylinder having a smaller diameter than the cooling cylinder is arranged concentrically in the cooling cylinder. The cooling cylinder and the inner cylinder form an annular interior in which a number of agitating rollers forming the agitating element are arranged. The axes of the agitating rollers extend parallel to the axis of the cylinders. The axes of the agitating rollers are located on a common circle arranged concentrically to the cylinders. The agitating rollers are driven by the cylinder.

7 Claims, 3 Drawing Sheets

APPARATUS FOR PROCESSING A COCOA BUTTER-CONTAINING OR SIMILAR FAT-CONTAINING MASS, PARTICULARLY A CHOCOLATE MASS

BACKGROUND OF THE INVENTION

1. Field of the Invention

The present invention relates to an apparatus for continuously processing a cocoa-butter containing or similar fat-containing mass, particularly a chocolate mass. The apparatus includes an outer stationary cooling cylinder, wherein the mass to be processed is pumped through the interior of the stationary cooling cylinder from one end face thereof into the area of the other end face. The apparatus further includes a driven agitating element in the interior of the cooling cylinder.

2. Description of the Related Art

In an apparatus of the above-described type which is known in the art, three cylinders are used which are connected in series one behind the other. A driven screw forming the agitating element is arranged in each cylinder. The cylinders form cooling or conditioning zones. The mass to be processed may deposit at the screws, wherein this deposited mass then no longer participates or only participates to a limited extent in the actual processing procedure. The screw also influences the conveyance of the mass through the cylinder, wherein the degree of conveyance is determined by the pitch of the screw. This is not always desirable because this limits the flexibility. Moreover, the apparatus is complicated because several cylinders must be connected one behind the other in series in order to be able to adjust the appropriate processing parameters for each cooling or conditioning stage.

DE-OS 88 17 255 discloses another apparatus which only requires one cylinder, however, in this cylinders a plurality of cooling levels are arranged one above the other. An agitating tool is moved through each level. Each agitating tool is mounted on a common drive shaft. In this apparatus it is also not possible to avoid a build-up of the mass in the individual cooling chambers.

SUMMARY OF THE INVENTION

Therefore, it is the primary object of the present invention to provide an apparatus of the above-described type in which a build-up of the mass in the interior or at the agitating element is prevented by contacting all surfaces where possible by other surfaces and, thus, cleaning the surfaces by means of these other surfaces. In addition, all surfaces, even those of the agitating element, are to be utilized for the heat transfer.

In accordance with the present invention, a driven inner cylinder having a smaller diameter than the cooling cylinder is arranged concentrically in the cooling cylinder. The cooling cylinder and the inner cylinder form an annular interior in which a number of agitating rollers forming the agitating element are arranged. The axes of the agitating rollers extend parallel to the axis of the cylinders. The axes of the agitating rollers are located on a common circle arranged concentrically to the cylinders. The agitating rollers are driven by the cylinder.

In accordance with an advantageous feature, the agitating rollers are dimensioned in relation to the interior in such a way that the agitating rollers roll on the inner walls of the cylinder, i.e., they are in contact with the inner walls of the cylinders.

The agitating rollers may be driven in a positively engaging manner, i.e., in such a way that the agitating rollers form the planetary gears and the cooling cylinder forms the sun wheel of a planetary gear system.

It is also possible that the agitating rollers are connected to the planetary gears and the inner cylinder to the sun wheel of a planetary gear system.

In accordance with another embodiment, a frictionally engaging drive using frictional force may be provided. In that case, the agitating rollers are connected to each other to be driven together by more or more cages. As a result, when the inner cylinder is rotated, the inner cylinder takes the agitating rollers along. A constant distance between the agitating rollers is maintained by the cage.

The apparatus according to the present invention ensures that all surfaces in the interior, i.e., the surfaces of the cylinders and of the agitating rollers are stripped, i.e., an undesired mass build-up is not possible in this apparatus. As the agitating rollers roll on the inner and outer walls formed by the cylinders, the agitating rollers themselves and the respective walls are being cleaned.

All surfaces in the interior are in mutual mechanical contact with each other and, thus, can be utilized for the heat transfer. This improves the efficiency of the cooling system. As a result of the relative movement between the surfaces of the cylinders and the agitating rollers, the mass is squeezed into various small gaps between the rollers and the cylinders and is processed at a very high pressure.

The number of agitating rollers is not fixed. The number of agitating rollers may be adapted to the mass to be processed, particularly to the viscosity of the mass. When the viscosity is high, fewer agitating rollers are used as necessary. A conditioning zone is frequently provided at the end of the processing procedure, i.e., after the cooling zone or cooling zones. In this conditioning zone, the crystal formation is stabilized by the crystallization heat and mechanical frictional heat and undesired crystal shapes are melted. As a result, a so called heating-up zone is not required.

The agitating rollers do not convey the mass. The mass is conveyed solely by the pump which pumps the mass through the annular interior. This makes possible a very flexible control. The rate of rotation of the agitating rollers is completely independent of the quantity of mass being conveyed. The rate of rotation may be freely adjusted, for example, for controlling the heating of the mass in the conditioning zone after the cooling zone.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 4:
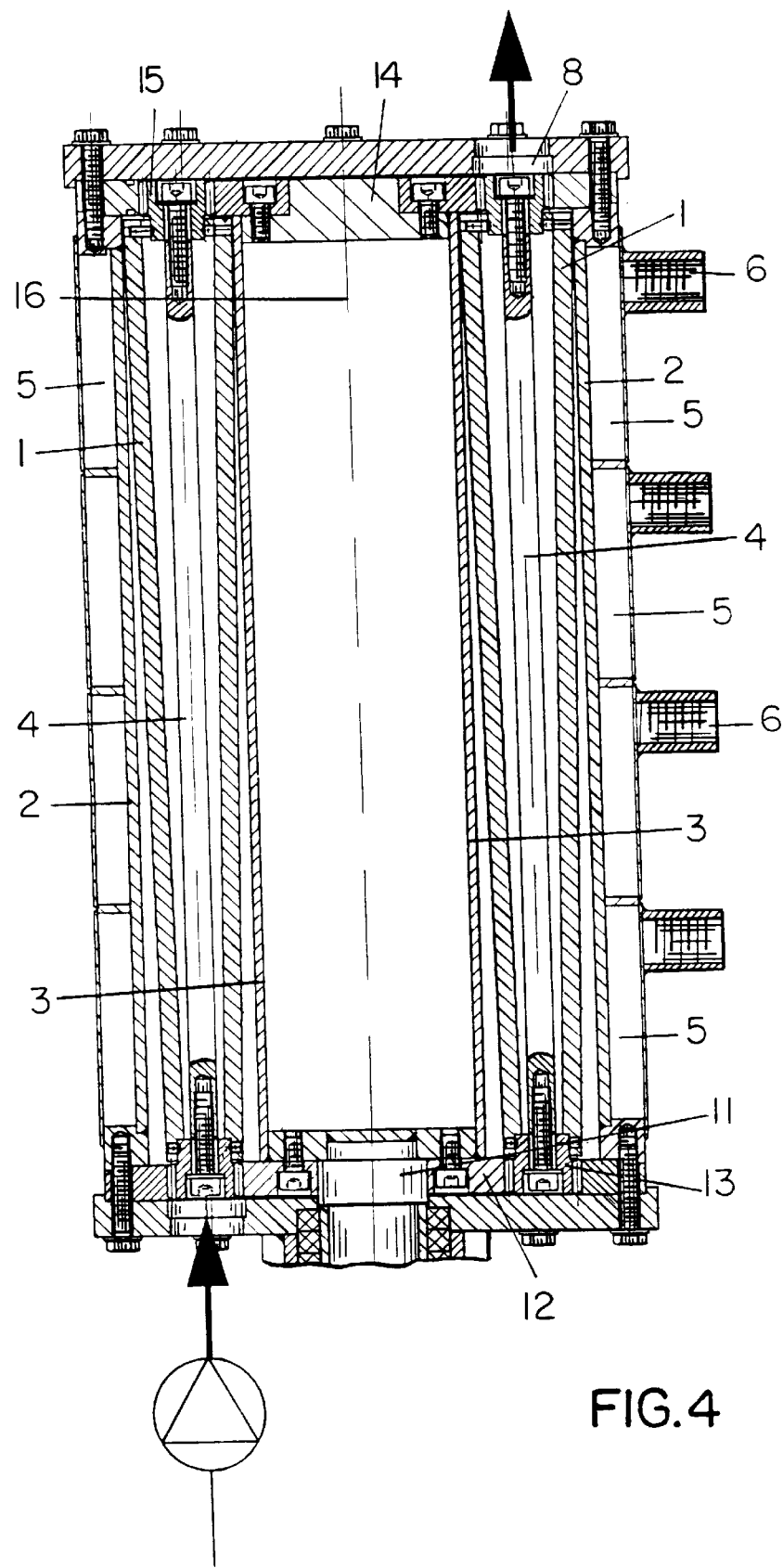
FIG. 4 is a longitudinal sectional view, similar to FIG. 1, showing another embodiment of the present invention.

The apparatus illustrated in the drawing, which may also be called a tempering apparatus, includes a stationary cylinder 2 having a center axis 16. An inner cylinder 3 having a smaller diameter is concentrically arranged within the cooling cylinder 2. The center axis of the inner cylinder 3 coincides with the center axis 16. This inner cylinder is connected to a shaft 11 which is driven for rotation by a motor, not shown. An annular interior 10 exists between the two cylinders 2 and 3. The mass is processed in this interior 10. The mass is fed into the interior by means of a pump at 7 as schematically illustrated in FIG. 4 and is discharged at 8.

The outer surface of the cooling cylinder 2 is divided into several cooling stages 5 in the conveying or processing direction, i.e. from one end face toward the other end face. The cooling agent is supplied through pipe connections 6 and discharged through pipe connections 9. For example, the last zone in the conveying direction, i.e., the zone adjacent the discharge opening 8, may also be operated without cooling. This depends entirely on the demands made of the mass to be processed.

Arranged in the annular interior 10 are a plurality of agitating rollers 1 which are rotatable about axes 4. The axes 4 are formed by shafts on which the agitating rollers 1 are rotatably mounted. The axes 4 are located on a common diameter whose center axis again is located in the center axis 16. The geometric relationships are readily apparent from FIGS. 2 or 3. The agitating rollers 1 have a diameter which corresponds to the difference of the diameter between the two cylinders 2 and 3, so that the agitating rollers 1 roll on the wall surfaces of the cylinders.

Figure 1:
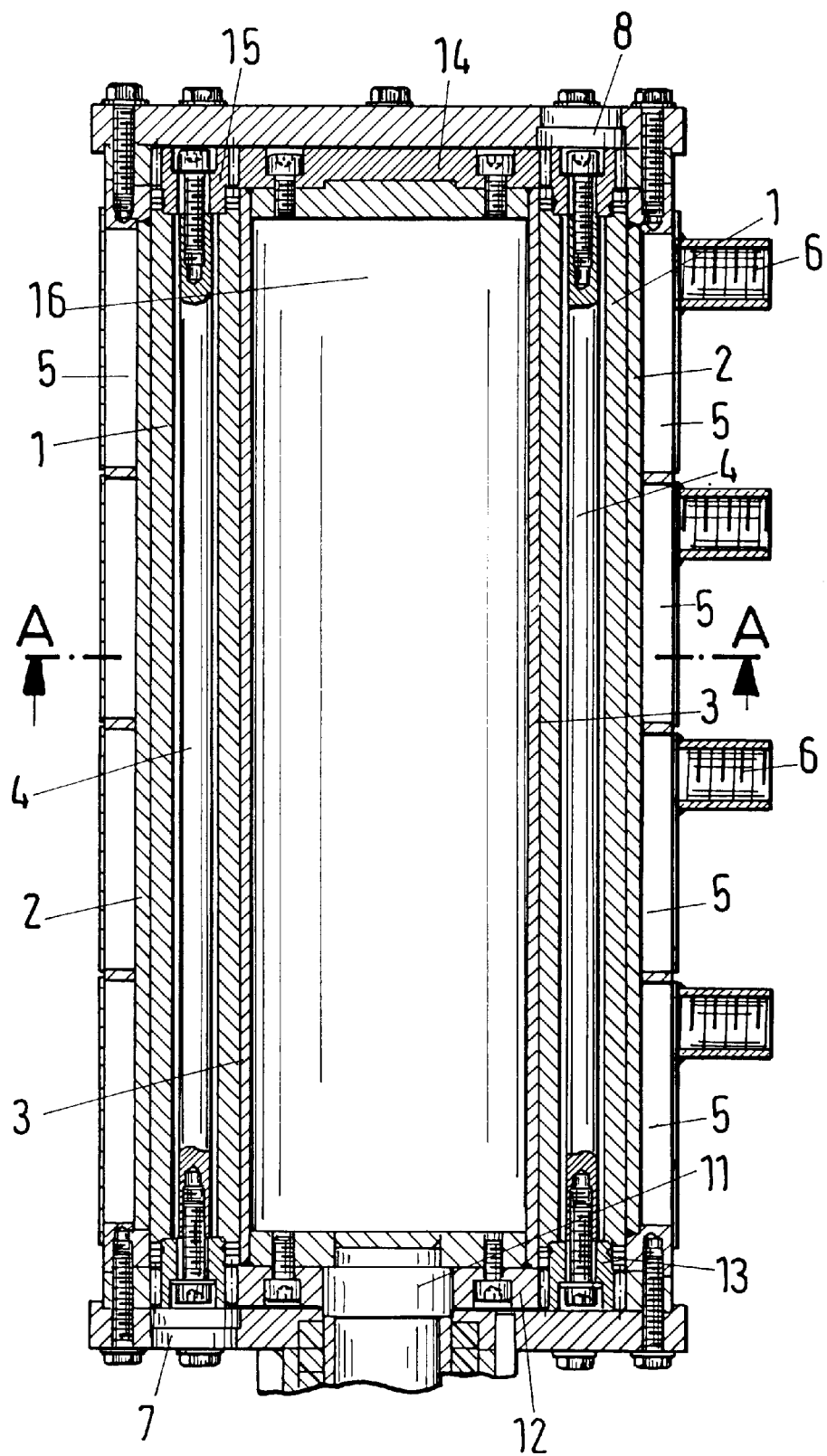
FIG. 1 is a longitudinal sectional view of an embodiment of the apparatus according to the present invention.
Figure 2:
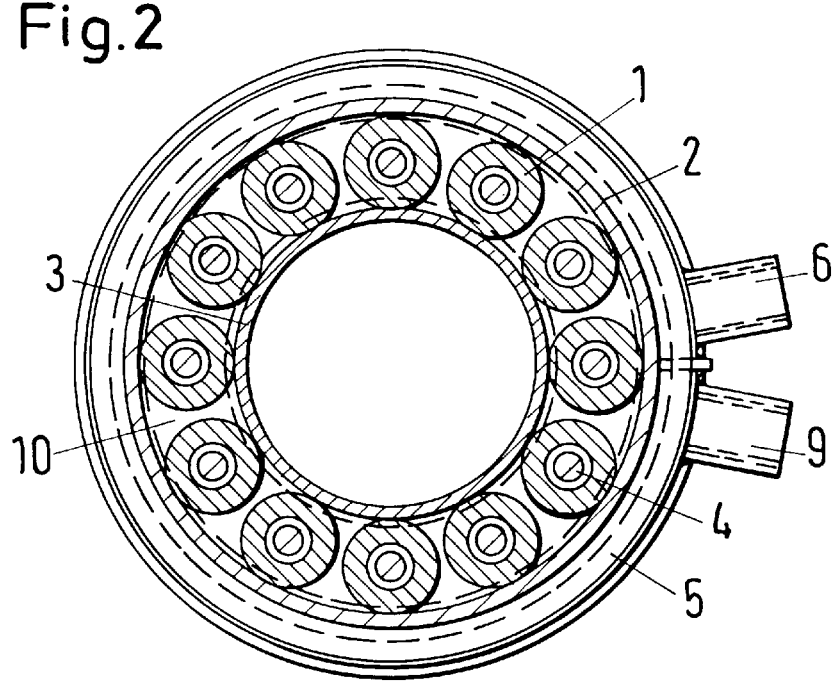
FIG. 2 is a cross-sectional view taken along line A—A of FIG. 1.

In the embodiment illustrated in FIGS. 1 and 2, the agitating rollers 1 essentially form planetary gears and the inner cylinder 3 forms the sun wheel of a planetary gear system. In the illustrated embodiment, the inner cylinder 3 is at the top and bottom attached to a sun wheel 12, 14, respectively. Each agitating roller is connected to a planetary gear 13, 15, respectively. The gear wheels of the corresponding planetary wheels 13, 15 are in engagement with the teeth of the corresponding sun wheels 12 and 14. In this embodiment shown in FIGS. 1 and 2, a drive resulting from a positive engagement takes place. When the sun wheels 12 and 14 are driven to rotate by means of the shaft 11, they drive the planetary wheels 13 and 15, so that the agitating rollers 1 are rotated as a result.

Figure 3:
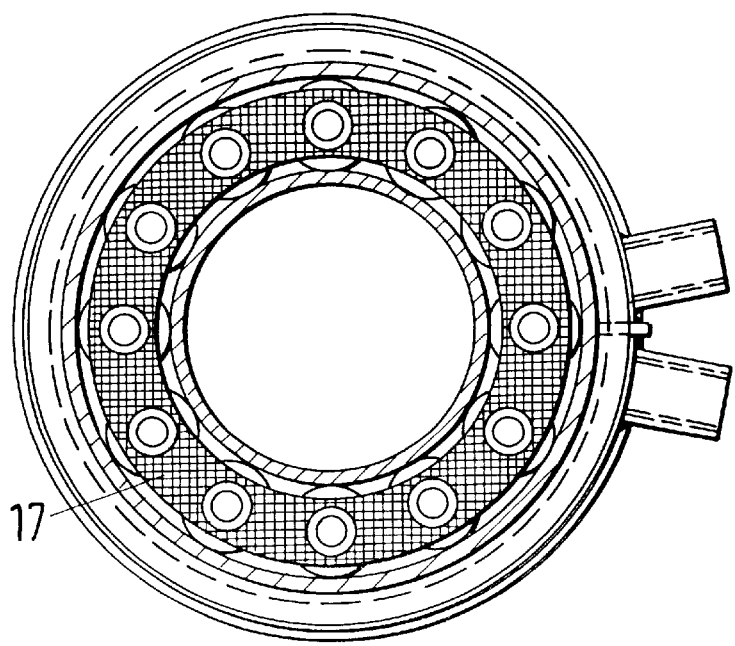
FIG. 3 is a cross-sectional view, corresponding to FIG. 2, of another embodiment of the apparatus according to the present invention.

The embodiment shown in FIG. 3 does not have a planetary gear system. In this case, the drive is effected in a frictionally engaging manner. Only the inner cylinder 2 is being driven to rotate. The friction between the inner cylinder and the individual agitating rollers 1 cause the agitating rollers 1 to rotate. The distance between the agitating rollers 1 is kept constant by means of cages 17, so that the agitating rollers 1 move uniformly through the annular interior 10.

Depending on its composition, its viscosity and other properties, the mass introduced at 7 is pumped quickly or slowly through the annular interior 10. The mass is forced through the gaps between the agitating rollers and the adjacent surfaces of the cylinders. The interior does not have surfaces which are not being contacted by other surfaces, so that these surfaces are stripped and cleaned again and again. Any mass build-up is prevented.

The agitating cylinders do not act to convey the mass. The agitating cylinders only act on the mass in the desired manner, depending on the speed at which the inner cylinder is being driven. The quantity of mass conveyed through the apparatus is determined independently by the pump, not shown. The agitating cylinders participate in the heat transfer because they are also cooled as a result of the contact with the inner surface of the outer cooling cylinder 2.

The apparatus has an optimum efficiency with respect to cooling and thermal influence. The conveyance of the mass through the apparatus can be freely adjusted taking into consideration various parameters. The number of agitating rollers 1 may be different; the number of agitating rollers 1 may depend on the mass to be treated, particularly the viscosity thereof. Fewer agitating rollers are required when the viscosity is high.

FIG. 1 shows an embodiment of the present invention in which the agitating rollers 1 are conically shaped with a circular cross-section.

While specific embodiments of the invention have been shown and described in detail to illustrate the inventive principles, it will be understood that the invention may be embodied otherwise without departing from such principles.

I claim:

1. An apparatus for continuously processing a cocoa butter-containing or similar fat-containing mass, particularly a chocolate mass, the apparatus comprising an outer stationary cooling cylinder having an interior and end faces, an inner cylinder having a smaller diameter than the cooling cylinder concentrically mounted within the cooling cylinder, an annular interior being defined between the cooling cylinder and the inner cylinder, further comprising a pump for pumping the mass through the annular interior from one end face to another end face, a plurality of agitating rollers mounted in the annular interior, wherein the cylinders have a center axis, wherein the agitating rollers have axes extending parallel to the center axis and located on a common diameter, further comprising drive means for driving the inner cylinder for rotation, wherein the inner cylinder is connected to the agitating rollers for rotating the agitating rollers.

2. The apparatus according to claim 1, wherein the cylinders have wall surfaces, and wherein the agitating rollers are mounted so as to roll on the surfaces of the cylinders.

3. The apparatus according to claim 1, comprising a planetary gear system comprised of planetary wheels formed by the agitating rollers and a sun wheel formed by the inner cylinder.

4. The apparatus according to claim 1, comprising a planetary gear system with planetary wheels and a sun wheel, wherein the agitating rollers are connected to the planetary wheels and the inner cylinder is connected to the sun wheel.

5. The apparatus according to claim 1, comprising at least one cage for connecting the agitating rollers for moving the agitating rollers together in the manner of a roller bearing.

6. The apparatus according to claim 1, wherein the agitating rollers are cylinders all having the same cross-section.

7. The apparatus according to claim 1, wherein the agitating rollers are conically shaped with a circular cross-section.

* * * * *